July 31, 1934.  C. H. WHITE  1,968,187

PLANTER

Filed April 21, 1930   3 Sheets-Sheet 1

Witness
Milton Lenoir

Inventor
Charles H. White
By Brown, Jackson, Boettcher & Dienner
Attorneys.

July 31, 1934.    C. H. WHITE    1,968,187
PLANTER
Filed April 21, 1930    3 Sheets-Sheet 2
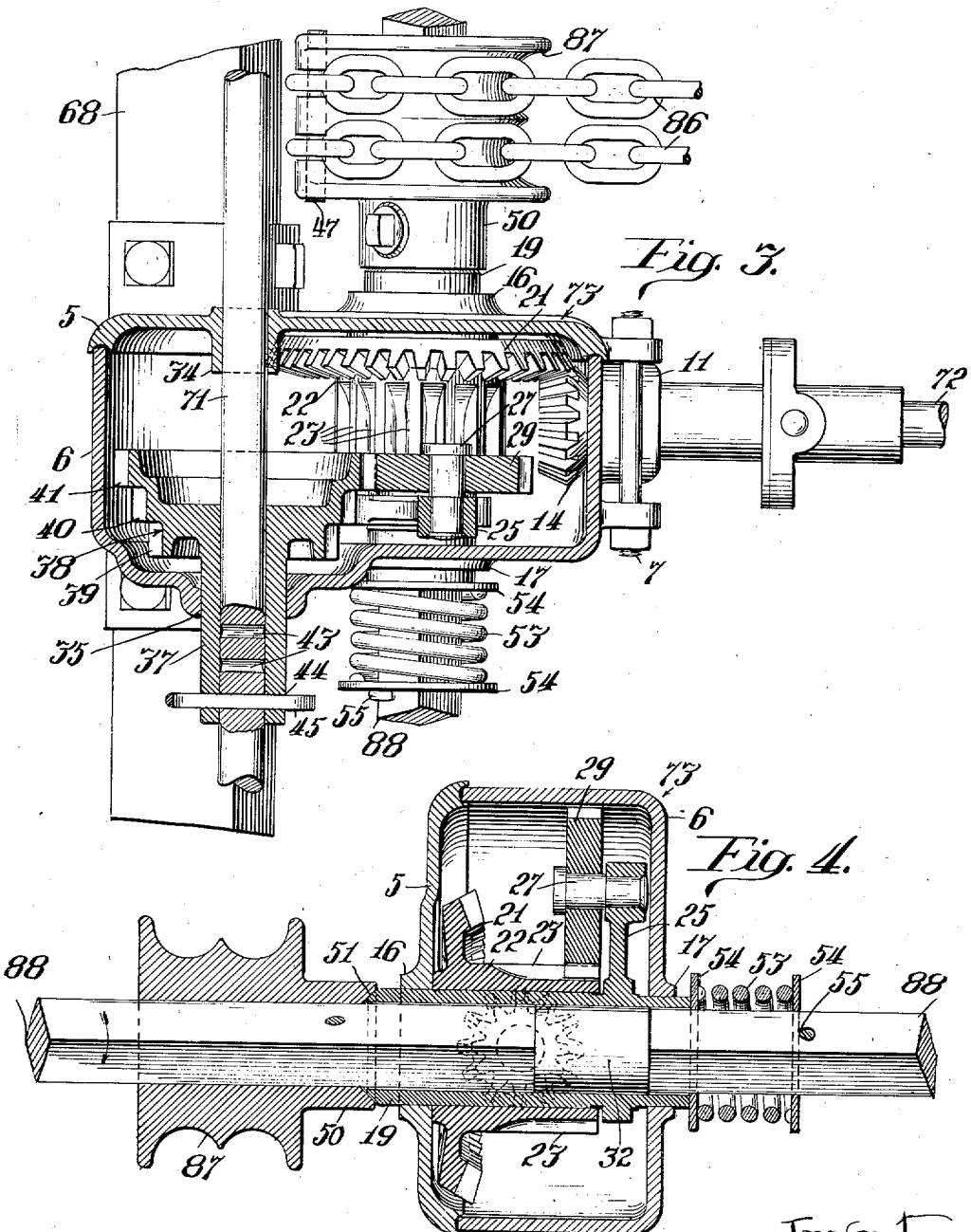
Inventor
Charles H. White
Witness
Milton Lenoir
By Brown, Jackson, Boettcher & Dienner
Attorneys

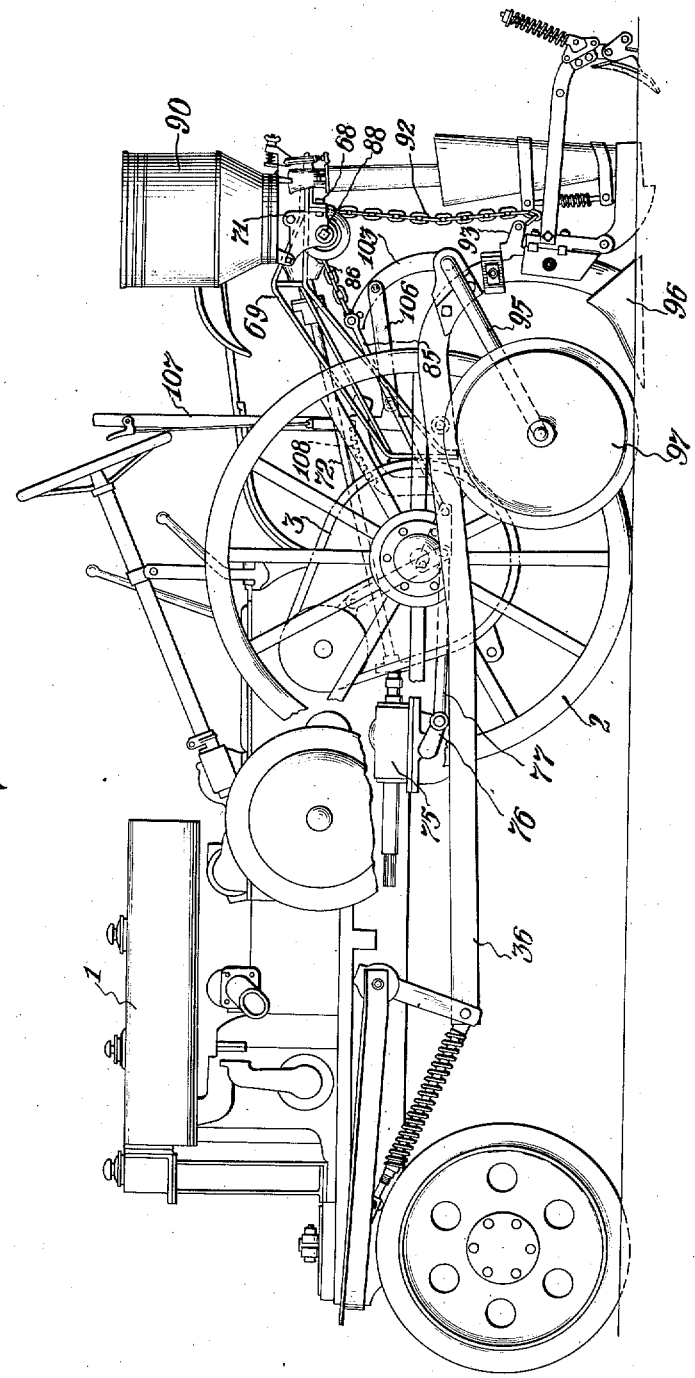

Patented July 31, 1934

1,968,187

UNITED STATES PATENT OFFICE 1,968,187

PLANTER

Charles H. White, Moline, Ill., assignor to Deere & Company, Moline, Ill., a corporation of Illinois Application April 21, 1930, Serial No. 445,993

31 Claims. (Cl. 111—67)

The present invention relates generally to agricultural implements which embody mechanism driven during the forward motion of the implement and which include means for raising and lowering the ground working tools of the implement. More particularly, my invention has to do with power driven planters wherein the seed mechanism is driven by a connection to the power take-off of the tractor, and the earth working tools are raised and lowered to and from transport position by means of a power lift. Such an implement is shown and described in the copending application Serial No. 362,486, filed May 13, 1929, by myself and Elmer McCormick to which attention is directed for details of the tractor and planter not specifically shown in this application. However, the broad features of the invention can also be embodied in a horse drawn implement, wherein the seed mechanism is driven by the tractive power of one of the implement wheels, and wherein the earth working tools are raised and lowered manually, or from this tractive power.

The principal object of my invention is the provision of a new and improved clutch mechanism by which the drive shaft of the planting mechanism is connected and disconnected from the power take-off of the tractor. The principal feature of my invention is that the shaft is automatically connected to the power take-off when the ground working tool of the planting mechanism is lowered into operating position, which connection is, in my invention, effective at the very commencement of the lowering operation. My invention also contemplates disconnecting the drive shaft of the planting mechanism from the power take-off automatically when the ground working tool is raised, and at the very commencement of the raising operation and irrespective of the depth adjustment at which the ground working tools are operating.

In all of the prior structures with which I am familiar the mechanism for interrupting the operation of the seeding mechanism is so arranged that the disconnection is not made until the ground working tool has been lifted to a given height, which height is necessarily some position above the shallowest planting position in which the machine is adapted to operate. In such structures whenever the ground working tool is being operated deeper than the shallowest position the seeding mechanism continues to operate while the ground working tool is being lifted from its obvious deeper position to its shallowest position. Since an operator does not ordinarily begin to lift the ground working tool until he wishes to stop planting, the seed deposited after he commences the lifting operation is more or less wasted.

This waste and loss of seed is avoided in planters and drills embodying my invention where the seeding mechanism is disconnected the very instant the lifting operation is begun.

It is of course possible in using devices of the prior art for the operator to start the lifting operation some time before he wishes to cease planting, but in this case the seed deposited after the lifting operation is commenced are not placed at the full proper depth.

It will therefore be observed by those skilled in the art that by virtue of my invention the interval of time between the commencement of the lifting operation and the stopping of the seed mechanism when planting from deep planting position as well as from shallow planting position has been practically eliminated.

Other objects and advantages of my invention will be apparent to those skilled in the art after a consideration of the following detailed description of one embodiment thereof which is illustrated in the accompanying drawings and in which:

Figure 3 is a cross-sectional view taken on the line 3—3 of Figure 2;

Figure 4 is a cross-sectional view taken on the line 4—4 of Figure 2; and

Figure 5 shows a complete implement embodying the principles of the present invention.

Figure 1:
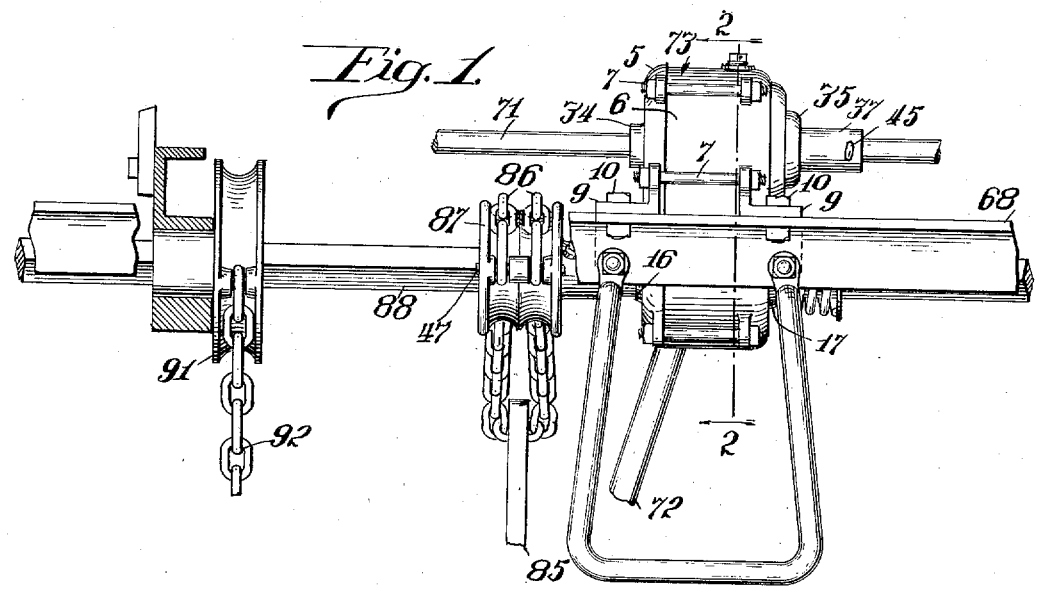
Figure 1 is a rear view of a planter embodying my invention, which view corresponds to the view shown in Figure 3 of the above mentioned copending application.

Referring now to the drawings, particularly Figure 5, the agricultural implement in which the principles of the present invention are embodied will be briefly described. This implement is described and claimed in the copending application referred to above and for specific details thereof reference may be had to that application. For the purposes of this disclosure it is sufficient to note that the agricultural implement comprises a tractor 1 of the general purpose type which includes a suitable main frame structure supported at its front end on steering wheels and at its rear end on traction wheels 2. The traction wheels 2 are rotatably supported by drive housings 3 forming a part of the main frame structure of the tractor.

The implement structure with which the present invention is particularly concerned is adapted for detachable mounting on the above described tractor and comprises, in general, a seeding mechanism indicated generally by the reference numeral 90 and including brackets 69 connected with the drive housings 3 and supported thereby. The seeding mechanism includes a seeding shaft 71 rotatably supported in a suitable frame construction which will be referred to later. The seeding mechanism also comprises vertically movable furrow openers or ground working tools 96. These tools are carried by pivoted beams 36 connected at their forward ends to the tractor 1 by means described in detail in the copending application referred to above.

The operating depth of the earth working tools 96 can be adjusted by gauge wheels 97 carried upon crank axles 95 pivotally connected with the rear ends of the beams 36. The crank axles 95 carry arms 103 with which adjusting levers 107 are connected through a link 106. The levers 107 are adapted to be adjusted manually and are equipped with the usual detent mechanism cooperating with sectors 108 for maintaining the depth of operation desired. The tools 96 are adapted to be raised from operating position to transport position by the power of the tractor by means described in detail in the copending application referred to above and which will be more specifically mentioned later.

The one or more transverse frame bars constituting the frame of the planter is indicated by the reference numeral 68 and corresponds to the same part indicated by the same reference numeral in the copending application referred to above. Mounted on the frame member 68 is a housing 73 comprising two mating sections 5 and 6 bolted together by means of bolts 7. Each of the sections is provided with an outwardly extending flange 9 by which the housing 73 is mounted on the frame member 68, as by bolts 10.

A power take-off shaft 72 is connected at its forward end to the power take-off 75 of the tractor 1 and at its rearward end the shaft 72 is journaled in a bearing 11 mounted in the housing section 6, as shown in Figure 3. Mounted on the shaft 72 and within the housing 73 is a pinion 14 which is adapted to drive a gear train to be described later.

Referring now to Figure 4, it will be observed that the housing sections 5 and 6 are each provided with a bearing boss indicated respectively by the reference numerals 16 and 17. Journaled within the bearing bosses 16 and 17 is a clutch sleeve 19 having its ends extending outside the housing 73. Rotatably journaled on the sleeve member 19 and within the housing 73 is a gear member 21 having teeth meshing with the teeth of the pinion 14 and also provided with an elongated sleeve 22 having teeth 23 formed therein.

An arm 25 is mounted on the sleeve 19 and adjacent the end of the sleeve 22, and near the outer end of the arm 25 is fixed a pin 27 upon which is journaled a small gear 29 the teeth of which mesh with the teeth 23 formed on the sleeve 22.

A transversely extending square lifting shaft 88 is journaled within the sleeve 19 and this shaft is provided with a cylindrical portion 32 by which the shaft is rotatably supported within the sleeve 19 and the housing 73.

The housing 73 is provided with a second pair of bearing bosses 34 and 35 formed respectively in the housing sections 5 and 6. The bearing boss 34 rotatably receives and supports the planting mechanism drive shaft 71 while the other bearing boss 35 rotatably receives and supports the sleeve portion 37 of the gear nest 38 which, as shown in Figure 3, is provided with three sets of teeth 39, 40 and 41. The shaft 71 passes through the sleeve 37 and in this way is supported in the bearing boss 35. The shaft 71 is provided with a plurality of holes 43 and the sleeve 37 has a hole 44 through which a pin 45 is adapted to be passed. As will be clear by looking at Figure 3, the pin 45 may be positioned in any of the holes 43 whereby to place any one of the sets of teeth 39, 40 or 41 in position to be engaged by the small gear 29.

The operation of the mechanism so far described is as follows. The shaft 72 being rotated from the power take-off of the tractor, the pinion 14 will rotate the gear member 21 in a counter-clockwise direction as viewed in Figure 2. The sleeve 22 will rotate with the gear member 21 and will thereby drive the gear 29 in a clockwise direction, and the latter will drive the gear nest 38 which in turn will drive the planting mechanism drive shaft 71. By adjusting the gear nest 38 longitudinally along the shaft 71 the gear 29 may be placed in engagement with the different sets of teeth 39, 40 and 41 so as to drive the shaft 71 at the desired speed. It will be seen from the foregoing that the pinion 14, gear 21, sleeve 22 formed integral with said gear 21 and having teeth 23, the gear 29 and the gear nest 38 provide what may be termed a system of force transmitting elements between the shaft 72 and the shaft 71.

It will be recognized that in implements of this class it is essential to raise the ground working tools of the planting mechanism from the ground when turning at the end of the rows or in moving the implement from one field to another. There is shown in the copending application referred to above one form of means for performing this raising and lowering of the planting mechanism by the power of the tractor, but since such means per se does not form a part of the present invention except as one element of the combination thereof it is believed unnecessary to completely show the power lift device. It will be sufficient to note that the tools 96 are adapted to be raised from operating position to transport position by the power of the tractor. For this purpose the power takeoff 75 of the tractor is utilized, the power lift crank 76 thereof being connected to swing suitable links 77 and 85, as best shown in Figure 5. A chain 86 is connected at its central portion to the rearward end of the member 85, as shown in Figure 1, and the ends of the chain 86 are extended rearwardly in parallel relation and trained over a double sheave 87 which is pinned to the squared lifting shaft 88. The end links of the chain 86 are fastened to the sheave 87 by means of a pin or bolt 47. Mounted on the squared lifting shaft 88 are a number of lifting sheaves 91. Only one of such lifting sheaves is shown but it is to be understood that there are or may be as many of these sheaves 91 as there are planting units. A flexible lifting member 92 is shown as pinned to the lifting sheave 91 and is adapted to be wound thereon as the power lift device 85 is actuated to rotate the lifting shaft 88 to raise the ground working tools of the planting mechanism. As will be understood from Figure 1 it is necessary that the chain 86 unwind from the double sheave 87 as the flexible lifting member 92 is wound up on the sheave 91, and vice versa.

As was pointed out above my invention contemplates interrupting the drive from the power take-off shaft to the planting mechanism at the very beginning of the lifting operation and which interruption is to be automatic, that is, without any act of the operator other than the act of initiating the lifting operation. The means I have provided to secure this result will now be described. Referring now to Figure 4, it will be observed that the double sheave 87 is mounted adjacent the housing 73 and is provided with a sleeve 50 having a cone-shaped clutching surface 51 cooperating with a complementarily formed surface on the end of the sleeve 19. The sleeve 19 is resiliently pressed into frictional engagement with the double sheave 87 by means of a spring 53 biased between a pair of washers 54, one abutting against the abutment pin 55 secured to the lifting shaft 88 and the other bearing against the other end of the sleeve 19.

The operation of the automatic clutching means whereby the planting operation is interrupted at the beginning of the lifting operation is as follows. When the power lift clutch is tripped to raise the ground working tools of the planting mechanism into non-operating position the chain 86 is caused to unwind from the double sheave 87 thus rotating the lifting shaft 88 and winding up the lifting member 92. The instant the double sheave 87 starts to rotate the sleeve 19, by virtue of the frictional engagement therewith, starts also to rotate and in a clockwise direction as viewed in Figure 2. This movement of the sleeve 19 immediately causes the arm 25 to disengage the gear 29 from the gear nest 38, the sleeve 19 and the arm 25 continuing to rotate in a clockwise direction until the gear 29 bears against the surface 60 of the housing section 6 which thereby acts as a stop for the gear 29, the arm 25 and the sleeve 19.

Thereafter as the shaft 88 and the sheave 87 continue to rotate to raise the ground working tools slippage takes place between the clutch surfaces formed on the sheave 87 and the sleeve 19 and continues until the ground working tools have been brought into their lifted position.

Figure 2:
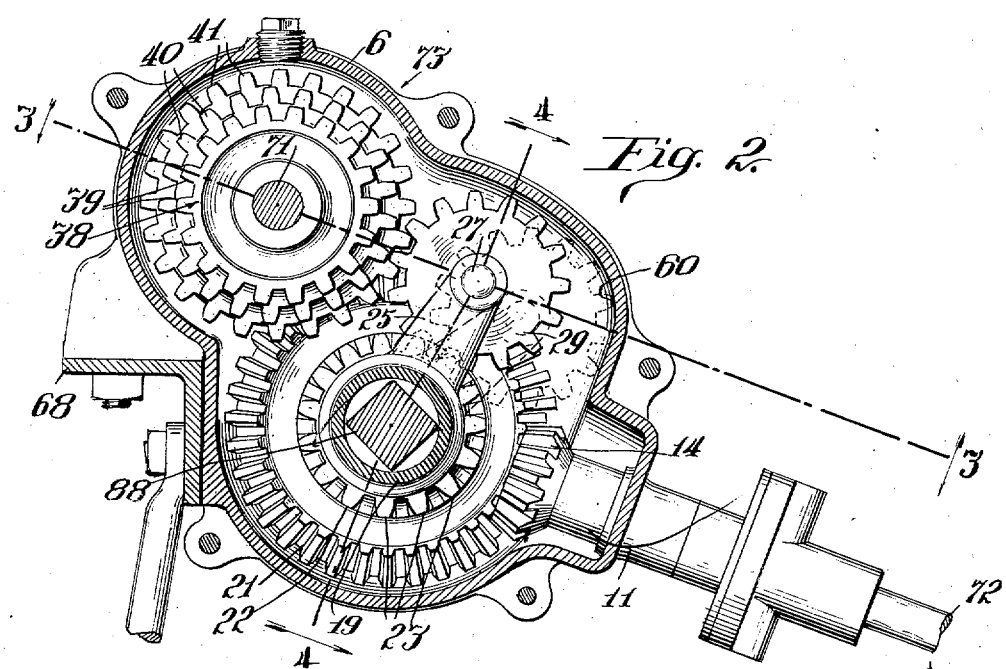
Figure 2 is an enlarged cross-sectional view taken on the line 2—2 of Figure 1.

When the power lift clutch is tripped to lower the ground working tools of the planting mechanism into operating position, the weight of the tools causes a counter-clockwise rotation of the shaft 88 and the sheave 87 as viewed in Figure 2. Due to the clutching engagement of the sleeve 19 with the surface 51 of the sheave 87 the arm 25 is rotated in a counter-clockwise direction, as viewed in Fig. 2, until the gear 29 meshes with the selected set of teeth of the gear nest 38. Thereafter as the shaft 88 continues to rotate in a counter-clockwise direction with the continued lowering of the ground working tools, slippage again takes place between the clutch surface 51 and the sleeve 19.

It will thus be observed that when the operator approaches the end of the rows with the ground engaging tools of the planting mechanism at the desired depth the tripping of the power lift device to raise the tools to transport position will practically instantaneously occasion the interruption of the drive from the power take-off to the planting mechanism. The interruption is practically instantaneous because the arm 25 has to move only a distance comparable to the depth of the teeth on the gear 29 in order to stop the operation of the planting mechanism. As was pointed out above, this arrangement is very desirable for the reason that the operator does not usually begin the lifting operation until he reaches the end of the rows and when he desires to discontinue the distribution of the seed.

In the devices of the prior art, so far as I am aware, there was a considerable lag between the beginning of the lifting operation and the interruption of the planting operation so that some of the seeds were deposited when the ground working tools were practically out of the ground. This is not possible with a device constructed according to my invention for the simple reason that the instant the lifting mechanism is brought into operation the planting mechanism is disconnected from the power driven shaft.

On the other hand, when lowering the tools to planting position the slight lag occasioned in moving the gear 29 from the position shown in dotted lines in Figure 2 against the surface 60 of the housing 73 to engaging position with the teeth of the gear nest 38 is beneficial in allowing the ground working tools to more nearly approach the proper depth before the planting mechanism is started in operation. Thus in the practice of my invention not only is the planting mechanism started and stopped automatically with the lifting mechanism and without attention on the part of the operator but also the operator can be assured that all of the seeds are deposited at the proper depth and he need not be concerned with tripping the lift mechanism, either in raising or in lowering, at any particular time in order to prevent the waste of seed by depositing them at the improper depth or by depositing them too near the ends of the rows.

While I have described in connection with the accompanying drawings, the specific form in which I prefer to embody my invention, it is to be understood that the invention is not to be limited to the specific means which I have herein shown and described, and that in fact widely different means may be employed in the practice of the broader aspects of my invention. Moreover, as I have previously remarked, the invention can also be embodied in a horse drawn implement wherein the tractive power of one or more implement wheels is utilized to drive the planting mechanism.

What I claim, therefore, and desire to secure by Letters Patent is:

1. In a planting implement, seeding mechanism including a ground working tool, means for driving said mechanism, means for raising and lowering said tool toward and from transport position, means for interrupting the operation of said seeding mechanism at the beginning of the raising operation and at one position of the tool, and means for restoring the operation of said seeding mechanism at the beginning of the lowering operation and at another position of the tool.

2. In a planting implement, seed feeding and dropping mechanism, soil working tools therefor including a driven shaft, a driving shaft, means including a movable member to connect the driving shaft with the driven shaft, lifting means for said tools, and means acting between the lifting means and the movable member at approximately the same rate of displacement as the lifting means to render the connecting means inoperative when the lifting means is actuated.

3. The combination with a power take-off of a tractor, of a planting implement having seed distributing mechanism including a furrow opener and operatively connected with the power take-off, means including a shaft deriving power from the motor of the tractor for lifting the furrow opener to transport position, and means comprising a member frictionally connected with said shaft and operable to disconnect the seed mechanism from the power take-off upon the commencement of the lifting operation, said member slipping with respect to said shaft upon the further rotation thereof in completing the lifting operation.

4. The combination with a power take-off of a tractor, a planting implement including seed feeding and depositing mechanism driven from said power take-off and means for raising and lowering the mechanism, including a rotatable member, of automatic means for disconnecting the said mechanism from the power take-off at the beginning of the raising operation, said means comprising a gear movable into and out of operative position by said rotatable member, and means acting in conjunction with said rotatable member to move said gear in accordance with the movement of the raising and lowering means.

5. In a mechanism of the class described, earth working tools, means for raising said tools, a power driven shaft, a gear driven thereby, a movable gear meshing with said first gear, planting mechanism having means for driving the same including gear means adapted to be actuated by said movable gear, and means operated by said tool raising means for moving the movable gear into and out of operation with said gear means.

6. In a mechanism of the class described, a power driven shaft, a gear driven thereby, a movable gear meshing with said first gear, planting mechanism having means for driving the same including gear means adapted to be actuated by said movable gear, and power operated means including a sleeve and an arm extending from said sleeve and connected with said movable gear for moving the movable gear into and out of operation with said gear means.

7. In a mechanism of the class described, a power driven shaft, a gear driven thereby, a power lift device including rotatable members, a movable gear meshing with said first gear, planting mechanism having means for driving the same including gear means adapted to be actuated by said movable gear, and means for moving the movable gear into and out of operation with said gear means, said means having a part in engagement with one of said rotatable members and adapted to move therewith whereby the planting mechanism is automatically thrown into and out of operation by said power lift.

8. The combination with power take-off and power lift devices, of planter actuating mechanism, and means actuated by the power lift devices for throwing said mechanism into and out of operative connection with the power take-off devices, said means including a member rotatable by said power lift devices and a second member in frictional engagement with said first member whereby initial movement of the power lift devices effects connection or disconnection of the planter actuating mechanism and the power take-off devices.

9. In a planting implement adapted to be attached to a tractor and comprising a plurality of planter units, a power take-off shaft adapted to be driven from the tractor, power lift means driven by said tractor and operatively connected to lift the planter units to their transport positions, seed planting mechanism driven by said power take-off shaft, means for controlling the operation of said seed planting mechanism actuated from said power lift means, said means including a frictional slip connection operative to effect control of the planting mechanism at the inception of the operation of the power lift, said means being unaffected by further operation of the power lift.

10. In a planting implement comprising a plurality of planter units and adapted to be propelled by a tractor having a power take-off and a power lift device, the combination of means for driving the planter units including a shaft driven by said power take-off, a system of gearing serially arranged and one gear of which is shiftable into and out of operative position, and a drive shaft connected with the planter units and driven by said gearing, and a sleeve adapted to be rotated by the power lift device for moving the shiftable gear.

11. In a planting implement comprising a plurality of planter units and adapted to be propelled by a tractor having a power take-off and a power lift device, the combination of means for driving the planter units including a shaft driven by said power take-off, a system of gearing serially arranged and one gear of which is shiftable into and out of operative position, and a drive shaft connected with the planter units and driven by said gearing, and a sleeve adapted to be rotated by the power lift device for moving the shiftable gear during initial movements of said power lift device.

12. In a planting implement comprising a plurality of planter units and adapted to be propelled by a tractor having a power take-off and a power lift device, the combination of means for driving the planter units including a shaft driven by said power take-off, a system of force transmitting elements, one of which is shiftable into and out of operative position, and a drive shaft connected with the planter units and driven from said elements, and means including an angularly movable part for shifting said one element and another part movable by the power lift during the initial movement thereof for positioning said first part.

13. In a planting implement comprising a plurality of planter units and adapted to be propelled by a tractor having a power take-off and a power lift device, the combination of means for driving the planter units including a shaft driven by said power take-off, a system of force transmitting elements, one of which is shiftable into and out of operative position, and a drive shaft connected with the planter units and driven from said elements, means including an angularly movable part for shifting said one element and another part movable by the power lift during the initial movement thereof for positioning said first part, and means acting to limit the movement of said first part.

14. In a planting implement comprising a plurality of planter units and adapted to be propelled by a tractor having a power take-off and a power lift device, the combination of means for driving the planter units including a shaft driven by said power take-off, a system of force transmitting elements, one of which is shiftable into and out of operative position, and a drive shaft connected with the planter units and driven from said elements, means including an angularly movable part for shifting said one element and another part movable by the power lift during the initial movement thereof for positioning said first part, and means acting to limit the movement of said first part, said last named means including a manually adjustable member.

15. A planting mechanism of the class described, comprising a plurality of planter units, a power driven shaft for moving said units to and from planting position, a shaft for driving the planter units, power means for actuating said latter shaft and including a power take-off shaft, a gear member driven therefrom, a sleeve encircling said first named shaft and movably carrying a gear driven by said gear member, and means adapted to be driven by said gear and connected with said second named shaft to drive the same and means adapted to connect the sleeve and said first shaft for simultaneous rotation whereby said gear is moved into and out of operative connection with said planter shaft driving means.

16. A planting mechanism of the class described, comprising a plurality of planter units, a power driven shaft for moving said units to and from planting position, a shaft for driving the planter units, said shafts extending transversely of said planting mechanism and in parallel relation, power means for actuating said shaft, and including a power take-off shaft, a gear member driven therefrom, a sleeve encircling said first named shaft and movably and rotatably carried thereon, a radial arm on said sleeve, a gear journaled on the arm and driven by said gear member, and gear means on the second named shaft and adapted to be engaged by said gear to be driven thereby, and means for moving said sleeve into frictional connection with said first named shaft whereby the position of said first named shaft determines the position of said gear.

17. The invention as defined by claim 16 together with means for limiting the movement of said sleeve.

18. A planting mechanism of the class described, comprising a plurality of planter units, a frame, a housing carried by the frame, a pair of shafts journaled in said housing, one of said shafts adapted to drive said units, means on the other of said shafts for moving said units to and from transport position, a sleeve pinned to said other shaft and operatively connected to a power lift device, power driven means for actuating said one shaft and including a power take-off shaft, a gear member driven therefrom, a sleeve encircling said other shaft and journaled in said housing, said gear member in said housing and including two sets of gear teeth, one set meshing with a pinion on the power take-off shaft, a gear journaled eccentrically on the sleeve in said housing and meshing with the other set of teeth on said gear member, and a gear member on said first shaft and adapted to be driven by the gear on the sleeve, means for biasing said sleeve for movement along the other of said shafts toward the sheave, there being cooperating surfaces on the sleeve and the sheave whereby movement of the sheave moves the sleeve.

19. In a planting implement, seed feeding mechanism including releasable elements, a ground working tool, means for moving said tool into and out of operative position, and clutch elements controlled by said means for releasing said elements to disable said feeding mechanism when said ground working tool is moved out of operative position.

20. In a planting implement, seed feeding mechanism including releasable elements, means for operating said mechanism, a ground working tool, raising and lowering means for moving said tool into and out of operative position, and a clutch comprising one clutch member operated by raising and lowering said means and a second clutch member engageable by said first clutch member for controlling said releasable elements.

21. In a planting implement, seed feeding and dropping mechanism, a ground working tool, means for raising and lowering the same, said means including a rock shaft, means including a gear mounted on a bracket journaled on said rock shaft for driving said mechanism, and means for moving said bracket responsive to the movements of said rock shaft.

22. In a planting implement, seed feeding and dropping mechanism, a ground working tool, means for lifting the same including a rockshaft, means including a gear mounted on a bracket journaled on said rockshaft for driving said mechanism and a clutch between said rockshaft and said bracket.

23. In a planting implement, seed feeding and dropping mechanism, a ground working tool, means including movable gear means for driving said mechanism, means for lifting the tool to transport position, and automatic means operable to move the gear means to disable the seed mechanism when the lifting means is operated, said last means including a clutch comprising one member driven by said lifting means and another member controlling motion of said movable gear means.

24. In a planting implement, seed feeding mechanism, a ground working tool, operable means for moving said tool into and out of operative position, and a clutch comprising one member rotatable by said operable means and another member engaging said first member and controlling said feeding mechanism.

25. In a planting implement, seeding mechanism including a ground working tool, means for driving said mechanism, means for raising and lowering said tool toward and from transport position, means actuated by the initial movement of said raising and lowering means in one direction for interrupting the operation of said seeding mechanism at the beginning of the raising operation, and means actuated by the initial movement of said raising and lowering means in the other direction for restoring the operation of said seeding mechanism at the beginning of the lowering operation.

26. In a planting implement, seeding mechanism including a feed shaft and a ground working tool, said tool being movable from a lower ground engaging position through an intermediate position to a transport position, means for driving the seeding mechanism, means for raising and lowering said tool from ground engaging position to transport position, and means engageable with said raising and lowering means and actuated by the initial movement thereof in either direction for disconnecting the seeding mechanism from the driving means therefor at the beginning of the raising operation before said tool is moved into said intermediate position and for connecting said seeding mechanism with said driving means at the beginning of the lowering operation before said tool is lowered to its intermediate position, said disconnecting means including mechanism serving as a lost motion connection providing for continued actuation of the raising and lowering means in either direction after the completion of the operation of said connecting and disconnecting means.

27. In a planting implement, seeding mechanism including a seed feeding shaft and a soil working tool therefor vertically adjustable on the implement, means for driving said seed feeding shaft, means for adjusting the depth of operation of said tool, means for raising and lowering said tool toward and from transport position, and means actuated by the initial movement of said raising and lowering means for interrupting the operation of said seed feeding shaft at the start of the raising operation regardless of the depth of operation of said tool, said means including an overrunning connection providing for the continued operation of said raising and lowering means after the operation of said seed feeding shaft has been interrupted.

28. In a planting implement, seeding mechanism including a driven shaft and a vertically adjustable ground working tool, said tool being vertically adjustable in ground engaging position and movable therefrom through an intermediate position to a transport position, means for driving the seeding mechanism, means for adjusting the tool in operating position, means for lifting the tool to transport position, and means for interrupting said driving means at the beginning of the raising operation, said means being movable substantially at the same rate of displacement as said lifting means and a given displacement of the latter serving to interrupt the driving means for said seeding mechanism regardless of the operating depth for which said tool is adjusted.

29. In a planting implement, seeding mechanism including a vertically movable ground working tool, means for driving the seeding mechanism, means for raising the tool to transport position, means for interrupting the driving connection with said seeding mechanism, and means for controlling said interrupting means comprising a pair of clutch elements, one element being connected with said lifting means and the other element being connected with said interrupting means, said clutch elements being so constructed and arranged as to slip relative to one another after the drive to the seeding mechanism has been interrupted and during the continuance of the lifting operation.

30. In a planting implement, seeding mechanism including a seed feeding shaft and a soil working tool therefor vertically adjustable on the implement, means for driving said seed feeding shaft, means for adjusting the depth of operation of said tool, means including a shiftable member for raising and lowering said tool toward and from transport position, and means including a part engageable with said shiftable member and adapted to be moved thereby for interrupting the operation of said seed feeding shaft at the start of the raising operation regardless of the depth of operation of said tool.

31. In a planting implement, seeding mechanism including a seed feeding shaft and a soil working tool therefor vertically adjustable on the implement, means for driving said seed feeding shaft, means for adjusting the depth of operation of said tool, means including a shiftable member for raising and lowering said tool toward and from transport position, and means including a part frictionally engageable with said shiftable member and adapted to be shifted by the initial movement of said shiftable member to interrupt the operation of said seed feeding shaft at the start of the raising operation regardless of the depth of operation of said tool.

CHARLES H. WHITE.

CERTIFICATE OF CORRECTION.

Patent No. 1,968,187.  July 31, 1934.

CHARLES H. WHITE.

It is hereby certified that error appears in the printed specification of the above numbered patent requiring correction as follows: Page 5, line 77, claim 20, strike out the word "said" and insert the same before "raising" in line 76; and that the said Letters Patent should be read with this correction therein that the same may conform to the record of the case in the Patent Office.

Signed and sealed this 18th day of September, A. D. 1934.

Leslie Frazer

Acting Commissioner of Patents.

(Seal)

working tool therefor vertically adjustable on the implement, means for driving said seed feeding shaft, means for adjusting the depth of operation of said tool, means for raising and lowering said tool toward and from transport position, and means actuated by the initial movement of said raising and lowering means for interrupting the operation of said seed feeding shaft at the start of the raising operation regardless of the depth of operation of said tool, said means including an overrunning connection providing for the continued operation of said raising and lowering means after the operation of said seed feeding shaft has been interrupted.

28. In a planting implement, seeding mechanism including a driven shaft and a vertically adjustable ground working tool, said tool being vertically adjustable in ground engaging position and movable therefrom through an intermediate position to a transport position, means for driving the seeding mechanism, means for adjusting the tool in operating position, means for lifting the tool to transport position, and means for interrupting said driving means at the beginning of the raising operation, said means being movable substantially at the same rate of displacement as said lifting means and a given displacement of the latter serving to interrupt the driving means for said seeding mechanism regardless of the operating depth for which said tool is adjusted.

29. In a planting implement, seeding mechanism including a vertically movable ground working tool, means for driving the seeding mechanism, means for raising the tool to transport position, means for interrupting the driving connection with said seeding mechanism, and means for controlling said interrupting means comprising a pair of clutch elements, one element being connected with said lifting means and the other element being connected with said interrupting means, said clutch elements being so constructed and arranged as to slip relative to one another after the drive to the seeding mechanism has been interrupted and during the continuance of the lifting operation.

30. In a planting implement, seeding mechanism including a seed feeding shaft and a soil working tool therefor vertically adjustable on the implement, means for driving said seed feeding shaft, means for adjusting the depth of operation of said tool, means including a shiftable member for raising and lowering said tool toward and from transport position, and means including a part engageable with said shiftable member and adapted to be moved thereby for interrupting the operation of said seed feeding shaft at the start of the raising operation regardless of the depth of operation of said tool.

31. In a planting implement, seeding mechanism including a seed feeding shaft and a soil working tool therefor vertically adjustable on the implement, means for driving said seed feeding shaft, means for adjusting the depth of operation of said tool, means including a shiftable member for raising and lowering said tool toward and from transport position, and means including a part frictionally engageable with said shiftable member and adapted to be shifted by the initial movement of said shiftable member to interrupt the operation of said seed feeding shaft at the start of the raising operation regardless of the depth of operation of said tool.

CHARLES H. WHITE.

CERTIFICATE OF CORRECTION.

Patent No. 1,968,187.        July 31, 1934.

CHARLES H. WHITE.

It is hereby certified that error appears in the printed specification of the above numbered patent requiring correction as follows: Page 5, line 77, claim 20, strike out the word "said" and insert the same before "raising" in line 76; and that the said Letters Patent should be read with this correction therein that the same may conform to the record of the case in the Patent Office.

Signed and sealed this 18th day of September, A. D. 1934.

Leslie Frazer

Acting Commissioner of Patents.

(Seal)